(No Model.)

J. H. JONES.
MOWING MACHINE.

No. 520,646. Patented May 29, 1894.

Witnesses:
E. Behel.
A. Davenport

Inventor:
James Herva Jones
By A. O. Behel
Attys.

UNITED STATES PATENT OFFICE.

JAMES HERVA JONES, OF ROCKFORD, ILLINOIS, ASSIGNOR TO THE ROCKFORD MANUFACTURING COMPANY, OF SAME PLACE.

MOWING-MACHINE.

SPECIFICATION forming part of Letters Patent No. 520,646, dated May 29, 1894.

Application filed November 20, 1893. Serial No. 491,382. (No model.)

*To all whom it may concern:*

Be it known that I, JAMES HERVA JONES, a citizen of the United States, residing at Rockford, in the county of Winnebago and State of Illinois, have invented certain new and useful Improvements in Mowing-Machines, of which the following is a specification.

My invention relates to the two wheeled class of "hinged bar" mowers, in which the inner end of the finger bar is hinged to the main frame, and both ends of the finger bar free to conform to unequal surfaces independent of the frame.

The object of my invention is two fold. First, to provide an independent and flexible lifting device, whereby the outer end of the finger bar of a mower may be floated or made to run lightly on the ground, with more or less weight as the operator may desire and thus prevent heavy draft or side draft, while passing over obstructions. Secondly, to apply this device to a finger bar in such a manner as to freely avoid any interference with the other parts of the mower when the finger bar is folded or placed upright for traveling.

Figure 1:
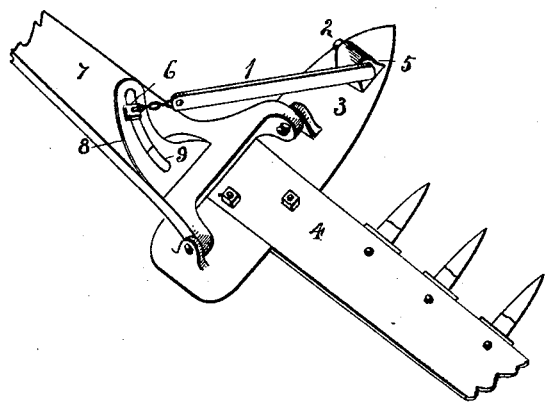
Figure 2:
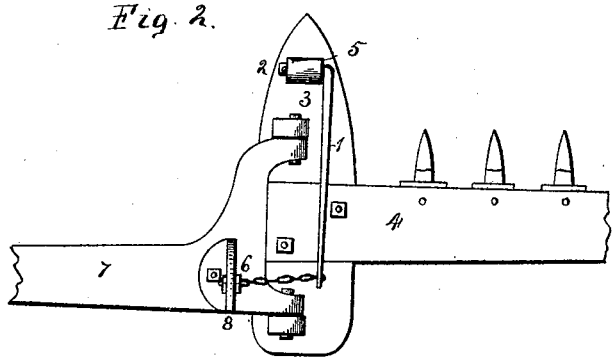
Figure 3:
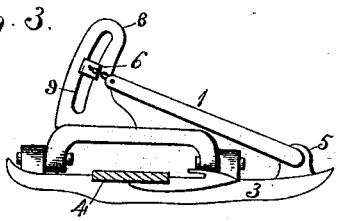
Figure 4:
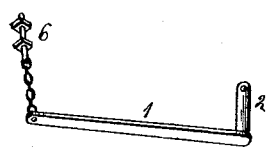

In the accompanying drawings, Figure 1, is a perspective view of the hinge and such parts of the main frame and finger bar of a mower as is necessary to clearly show the application of my improvement. The point of view is behind the finger bar, and about the middle of its length. Fig. 2, is a plan or downward view of the same parts. Fig. 3, is an end elevation of the same, with point of view along the length of the finger bar. Fig. 4, is a perspective view of a flat or bar spring, which, with its loosely jointed connection is the principal member of my invention.

The nature of my invention consists in constructing a steel spring 1, of flat or bar form, preferably decreasing in thickness along its length. A cylindrical pivot or journal 2, is made at one end, which projects from one flat side, at a right angle approximately to its body. Upon one end of the inner shoe 3, which forms a part of the finger bar 4, preferably on the front end, a cylindrical recess or sleeve 5, is provided, the axis of which is, substantially parallel with the upper surface of the shoe and at a right angle, approximately to its central longitudinal line. The journal 2, of the spring 1, is inserted in this recess 5, and secured by a pin through its end. The free end of the spring is thus enabled to drop down, and its body lie close across the finger bar 4, at a right angle to its line, of length or it may rise in an arc to any desired height above the bar while it still remains rigid in the line of length of the bar. To the free end of the spring 1, a loosely jointed connection 6, is attached, which is preferably a chain with a screw threaded eyebolt and two nuts thereon. The coupling bar 7, of the mower to which the finger bar 4, is hinged, is provided with a substantially vertical part 8, conveniently near, but above and on the opposite side of the finger joint from the spring. In this vertical part 8, a slot 9, is formed, or it may be a series of holes, of an arc practically corresponding with the movement of the free end of the spring 1, and of sufficient length to admit of proper adjustment of the end of the spring.

The eyebolt of the connection 6, enters this slot 9, and is secured therein, at any desired height by a screw nut on each side. It is plainly apparent that when the eyebolt 6, is moved to the upper limit of the slot 9, it will hold the free end of the spring 1, when properly strained at a greater height above the hinge joint of frame 7, and bar 4, than when it is moved to the lower limit. The result is that the mechanical leverage of the spring 1, on the finger bar 4, is easily varied at will, as often as the eyebolt 6, is changed in the slot 9, and no change made in the length of the connection or tension of the spring. By this means a variable pressure of the outer end of the finger bar on the ground may be obtained. When the finger bar 4, is folded up, or placed upright for traveling on the road the loose jointed connection 6, between the spring 1, and the main frame 7, will be slackened and whatever distance the free end of the spring 1, may have been up from the hinge of the mower, it will in this case drop and fold across the finger bar. Thus it will avoid all contact or interference with the coupling bar and the support for the push bar connected therewith. The finger bar could not be raised to a vertical position except for this free jointed arrangement of the spring.

I claim as my invention—

In a mowing machine, the combination of a finger bar, a shoe connected to its inner end, a coupling bar having a hinge joint connection with the shoe, a bar spring having a journal connection with the shoe near its point and extending rearwardly transversely to the length of the finger bar, a support rising from the coupling bar provided with an elongated curved slot and a flexible connection between the support and the free end of the bar spring.

JAMES HERVA JONES.

Witnesses:
A. O. BEHEL,
E. BEHEL.